US008626589B2

(12) United States Patent
Sengupta et al.

(10) Patent No.: US 8,626,589 B2
(45) Date of Patent: Jan. 7, 2014

(54) AUCTION-BASED APPLICATION LAUNCHING

(75) Inventors: Caesar Sengupta, Sunnyvale, CA (US); Felix Lin, Hillsborough, CA (US)

(73) Assignee: Google Inc., Mountain View, CA (US)

( * ) Notice: Subject to any disclaimer, the term of this patent is extended or adjusted under 35 U.S.C. 154(b) by 331 days.

(21) Appl. No.: 13/014,358

(22) Filed: Jan. 26, 2011

(65) Prior Publication Data
US 2012/0191560 A1      Jul. 26, 2012

(51) Int. Cl.
*G06Q 30/00*      (2012.01)
(52) U.S. Cl.
USPC ................... 705/14.71; 705/14.6; 705/27.2
(58) Field of Classification Search
USPC ................ 705/26.1, 14.1, 14.71, 14.6, 27.2
See application file for complete search history.

(56) References Cited

U.S. PATENT DOCUMENTS

| | | | |
|---|---|---|---|
| 2004/0155901 A1 | 8/2004 | McKee et al. | |
| 2008/0071594 A1* | 3/2008 | Morin | 705/7 |
| 2008/0082395 A1* | 4/2008 | Shulman et al. | 705/10 |
| 2009/0234716 A1* | 9/2009 | Mallick et al. | 705/10 |
| 2011/0029378 A1* | 2/2011 | Ramer et al. | 705/14.46 |
| 2011/0119137 A1* | 5/2011 | Morsa | 705/14.71 |
| 2011/0307354 A1* | 12/2011 | Erman et al. | 705/27.1 |

OTHER PUBLICATIONS

Rash, C. Brandon, "United States: Court Affirms SJ That Google's Online Advertising System Did Not Infringe", dated Jun. 14, 2010.*
Yuan, Jia, "Essays on Sponsored Search Auctions", University of Minnesota, dated Jul. 2009.*
Aggarwal, Gagan et al, "Bidding to the top: VCG and Equilibria of position-based Auctions", Google Inc, dated 2007.*
International Search Report and Written Opinion mailed Feb. 6, 2012 for Appl. No. PCT/US2011/059949, 14 pages.
Daisuke Kamisaka et al., "Operation Prediction for Context-Aware User Interfaces of Mobile Phones", Applications and the Internet, 2009. Saint '09. Ninth Annual International Symposium on, IEEE, Piscataway, NJ, USA Jul. 20, 2009, pp. 16-22, XP031524682, ISBN: 978-1-4244-4776-3.
Singhal, Nitish, "Removes All Unwanted Programs From New Computer," Trouble Fixers, Sep. 15, 2010, http://www.troublefixers.com/removes-unwanted-programs-from-new-computer/, downloaded Apr. 25, 2011, 6 pages.
Gaylord, Chris, "Got a New Computer? Install These Nine Programs Right Away," The Christian Science Monitor, Jan. 7, 2010, http://www.csmonitor.com/Innovation/Tech-Culture/2010/0107/Got-A-New-Computer-Install-These-Nine-Programs-Right-Away, downloaded Apr. 25, 2011, 2 pages.

* cited by examiner

*Primary Examiner* — Mark Fadok
(74) *Attorney, Agent, or Firm* — Sterne, Kessler, Goldstein & Fox PLLC (57) ABSTRACT

Methods and systems for providing applications are provided. A method for providing applications may include determining a ranking for each of a plurality of applications based on an auction value of each corresponding application. In some cases, auction values may be determined by application provider bids. The method may also include determining a ranked placement of the applications based on the application rankings. The method may further include displaying the ranked placement according to a first user selection associated with the applications. The method may then include launching a selected application of the ranked placement in response to a second user selection. A system for providing applications may include an application ranker, an application placer and an application launcher.

20 Claims, 6 Drawing Sheets

AUCTION-BASED APPLICATION LAUNCHING

TECHNICAL FIELD

The field relates to applications and operating systems.

BACKGROUND

Computers, netbooks, smartphones and other consumer electronics devices provide users various software applications. An operating system may utilize an application launcher to provide a starting point for the services or applications that are available to the end user on each device. For example, in some operating systems, the application launcher is a start menu. On many cell phones and smartphones, the initial "start deck" shows icons for launching the applications that complement the basic telephony functions. Even within many service-oriented websites, there is a home page or navigation bar that helps guide end users to the applications and services available from that site. On smartphones or computers, an application launcher might also be an application store from which applications are purchased for installation and later use.

Device manufacturers and service providers have historically negotiated bundling arrangements with software vendors who would be willing to pay for placement of their applications on the application launchers of devices. For example, computer manufacturers get paid by security software vendors to bundle a trial version of security software on a computer, and wireless carriers get paid by interne search providers for placement on the start deck.

However, these ways of placing applications are sub-optimal because device manufacturers must negotiate with each software and service vendor directly. The bundling arrangements are inefficient—a fixed price is locked in for a long period of time (often 12-36 months). Smaller device vendors have a weaker negotiating position and cannot command the "market clearing price" for helping the software vendor acquire a new customer. As a result, the end user experience suffers because the choice of bundled options is not necessarily driven by what provides the best end-user experience. Also, as software evolves and end-user needs change over time, the bundled options and the bounties paid do not change. New entrants are unable to win placement on the start decks of devices that are in service, even if they are willing to pay a bounty for acquiring customers.

BRIEF SUMMARY

Embodiments relate to systems and methods for providing applications. According to an embodiment, a method for providing applications may include determining a ranking for each of a plurality of applications based on an auction value of each corresponding application. In some cases, auction values may be determined by application provider bids. The method may also include determining a ranked placement of the applications based on the application rankings. The ranked placement may also be determined based on a combination of the application rankings, bid amounts and relevancy. The relevancy may be determined by tracking data such as installation and churn rates. The method may further include displaying the ranked placement according to a first user selection associated with the applications. The method may then include launching a selected application of the ranked placement in response to a second user selection.

According to another embodiment, a system for providing applications may include an application ranker configured to determine a ranking for each of a plurality of applications based on an auction value of each corresponding application. The system may also include an application placer configured to determine a ranked placement of the applications based on the application rankings. The ranked placement may also be determined based on a combination of the application rankings, bid amounts and relevancy. The system may further include an application launcher configured to display the ranked placement according to a first user selection associated with the applications and launch a selected application of the ranked placement in response to a second user selection.

Further embodiments, features, and advantages of the invention, as well as the structure and operation of the various embodiments of the invention are described in detail below with reference to accompanying drawings.

BRIEF DESCRIPTION OF THE FIGURES

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

An operating system may utilize an application launcher to provide a starting point for the services or applications that are available to the end user on each device. For example, in some operating systems, the application launcher is a start menu or a start deck. Device manufacturers and service providers have historically negotiated bundling arrangements with software vendors who would be willing to pay for placement of their applications on the devices. However, these ways of placing applications are sub-optimal and the end user experience suffers because the choice of bundled options is not necessarily driven by what provides the best end-user experience.

The embodiments described below provide an auction-based approach to configuring application launchers. An auction-based approach to application launching provides a scalable, efficient, revenue-maximizing alternative that would yield the most relevant set of default services for end users. Such an auction-based approach increases relevancy and maximizes revenue produced from, for instance, ads placed next to keyword-based search results. An auction-based approach may be used to recommend the best application for each of the primary types of application services that might appear on an application launcher.

Figure 1:
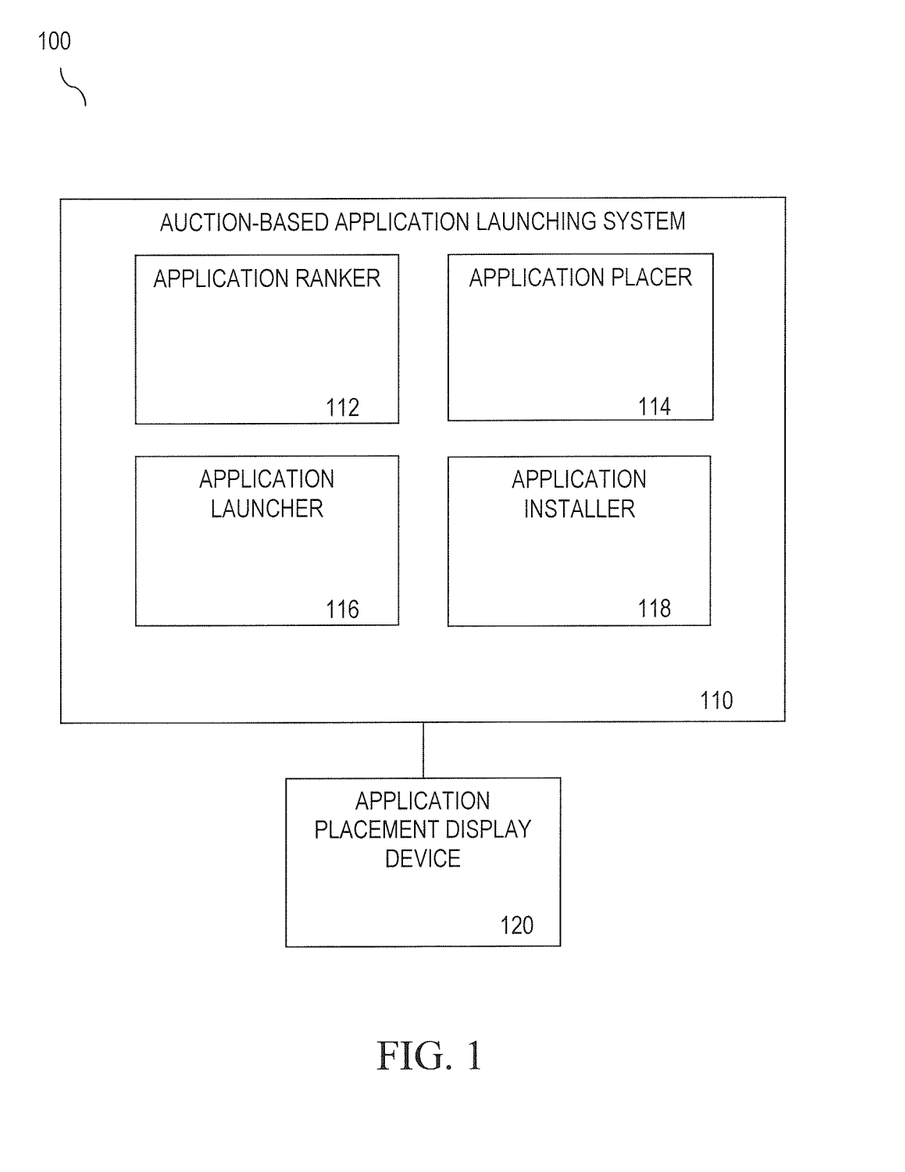
FIG. 1 illustrates an architecture diagram of a system for providing applications according to an embodiment

FIG. 1 is an architecture diagram of exemplary application launcher system 100, according to an embodiment. Application launcher system 100, or any combination of its components, may be part of or may be implemented with a computing device. Examples of computing devices include, but are not limited to, a computer, workstation, distributed computing system, computer cluster, embedded system, stand-alone electronic device, networked device, mobile device (e.g. mobile phone, smart phone, navigation device, tablet or mobile computing device), rack server, set-top box, internet-connected TVs, printers, consumer electronics devices or other type of computer system having at least one processor and memory. Such a computing device may include software, firmware, hardware, or a combination thereof. Software may include one or more applications and an operating system. Hardware can include, but is not limited to, a processor, memory and user interface display.

Application launcher system 100 may include auction-based application launching system 110 coupled to application placement display device 120. Application placement display device 120 may be a screen, monitor or other device for displaying an application start deck, start menu or other representations of applications. Launching system 110 may also be included on or part of device 120. According to an embodiment, launching system 110 may include application ranker 112, application placer 114 and application launcher 116. In some cases, launching system 110 may also include application installer 118. Application ranker 112, application placer 114, application launcher 116 and/or application installer 118 may be implemented using hardware, software, firmware, tangible computer readable or computer usable storage media having instructions stored thereon, or a combination thereof and may be implemented in one or more computer systems or other processing systems.

According to an embodiment, application ranker 112 may be configured to rank applications based on an auction value of each corresponding application. There are different types of applications that may be ranked. Examples of important categories of applications include:
  internet search [Google™, bing™, Ask®, Yahoo!®, WolframAlpha®]
  video streaming [YouTube, Hulu™, Fox, NBC, ABC, CBS]
  music streaming [Spotify™, Pandora®, Real®]
  webmail [Gmail™, Hotmail®, Yahoo!®Mail]
  social networking [Facebook, Orkut, LinkedIn®, Friendster®]

Rather than having every device manufacturer negotiate with each service provider, manufacturers may place in each "slot" of the start deck in each category, an application using an auction-based approach, according to an embodiment. An auction-based approach may yield a "default" or recommended option for each category, along with a ranked placement of alternatives. For a brand new device, an application launcher might be populated with default options that are dynamically determined and ranked based on an auction value.

Various factors may form an auction value. Such factors may include a bid price, which is the maximum amount that an application or service provider is willing to pay to "acquire" a customer. For instance, this payment may be made when an end user clicks through or selects an application for the first time. It is also possible for bids to include other arrangements or concepts other than maximum monetary amounts. For example, bids may include offering certain services or portions of an application to a user. Bids may involve advertisement negotiation. For example, known methods of internet advertising with keywords may be used to determine bids and auction values. Bids may also include subscription arrangements. In some cases, bids may relate to more specific requirements for placement, including temporary or timed placements. Bids for application placement may be collected before the first placement of the applications by the device provider. Bids may also be taken after the first placement of the applications. There may be certain periods of time that bids are taken. In some cases, bids may affect application placement after user input.

Other factors may be used to determine an auction value. For example, clickthrough rate may be a factor. A clickthrough rate may indicate how often end users click through to the service when presented with the option. Churn rate is another factor. Churn rate indicates how often end users click on an icon or representation of an application category to find an alternate application for that category. Various other factors may be used to determine an auction value for purposes of ranking. Application ranker 112 will determine a ranking based on the auction values of the applications. This ranking may be adjusted by other data that may include, but is not limited to, click-through and churn rates.

Application placer 114 may be configured to determine a placement of the applications based on the auction values. This placement may be a stack, a list, a circle or any other arrangement. In some cases, higher ranked applications may not necessarily receive a preferred placement due to a revenue generation strategy. According to a further embodiment, application launcher 116 may be configured to display or provide for display a determined application placement. The placement of applications may be displayed using, for example, application placement display device 120. The ranked placement may also be determined based on a combination of the application rankings, bid amounts and relevancy. The relevancy may be determined by tracking data such as installation and churn rates.

Figure 2:
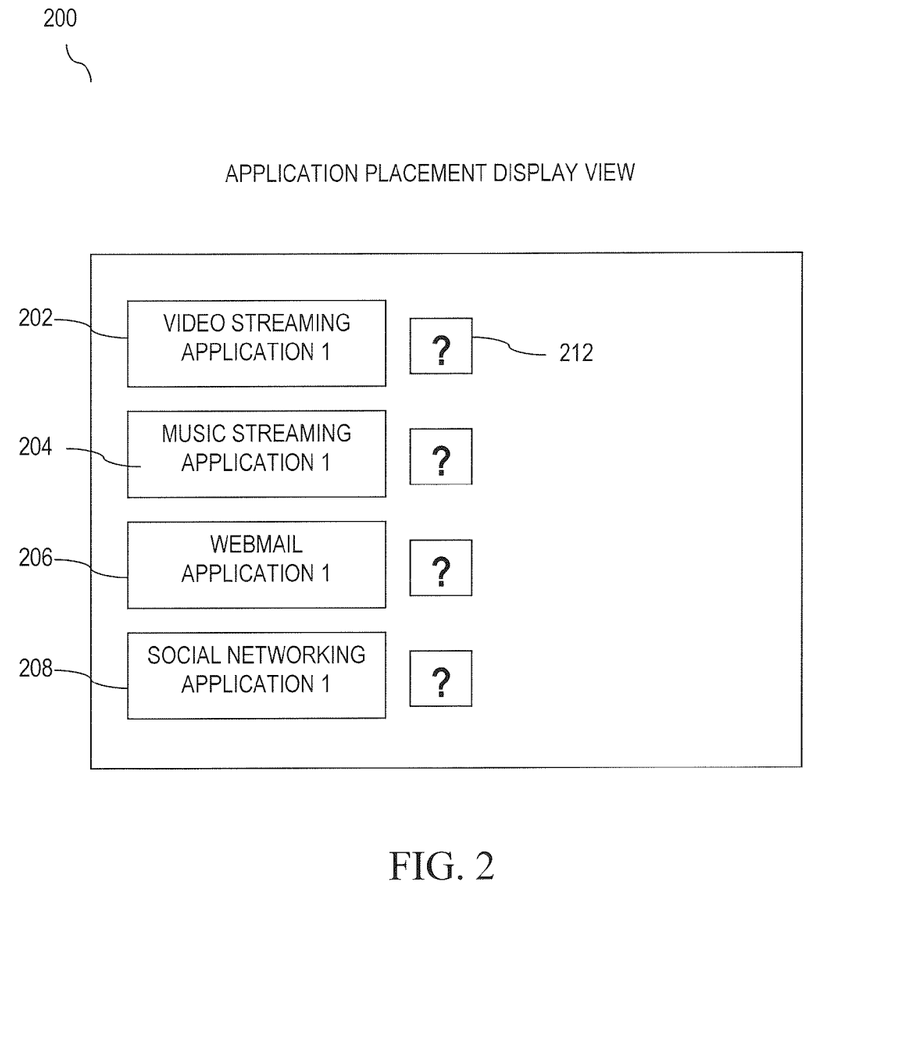
FIG. 2 illustrates an example display view of applications that may be selected according to an embodiment.

An example of application placement, as viewed by an end-user of device 120 (possibly a new device), is provided in FIG. 2. FIG. 2 represents an example display view 200 of application categories. Display view 200 shows video streaming application 1 202, music streaming application 1 204, webmail application 1 206 and social networking application 1 208. Each application is followed by a "1", which in this case represents an initial ranking based on auction values. These highest ranked applications initially stand alone in this example as a recommended or preferred application for each application category. These application categories may also be arranged or placed based on auction values.

Each category has an icon that may provide alternate applications for the category. For example, icon 212 may be used to show alternative applications for the category. When selected, icon 212 may provide a pull-down list of alternative applications for the selected category. In the example display view of FIG. 3, application placer 114 has the list sorted by rank from highest to lowest.

Figure 3:
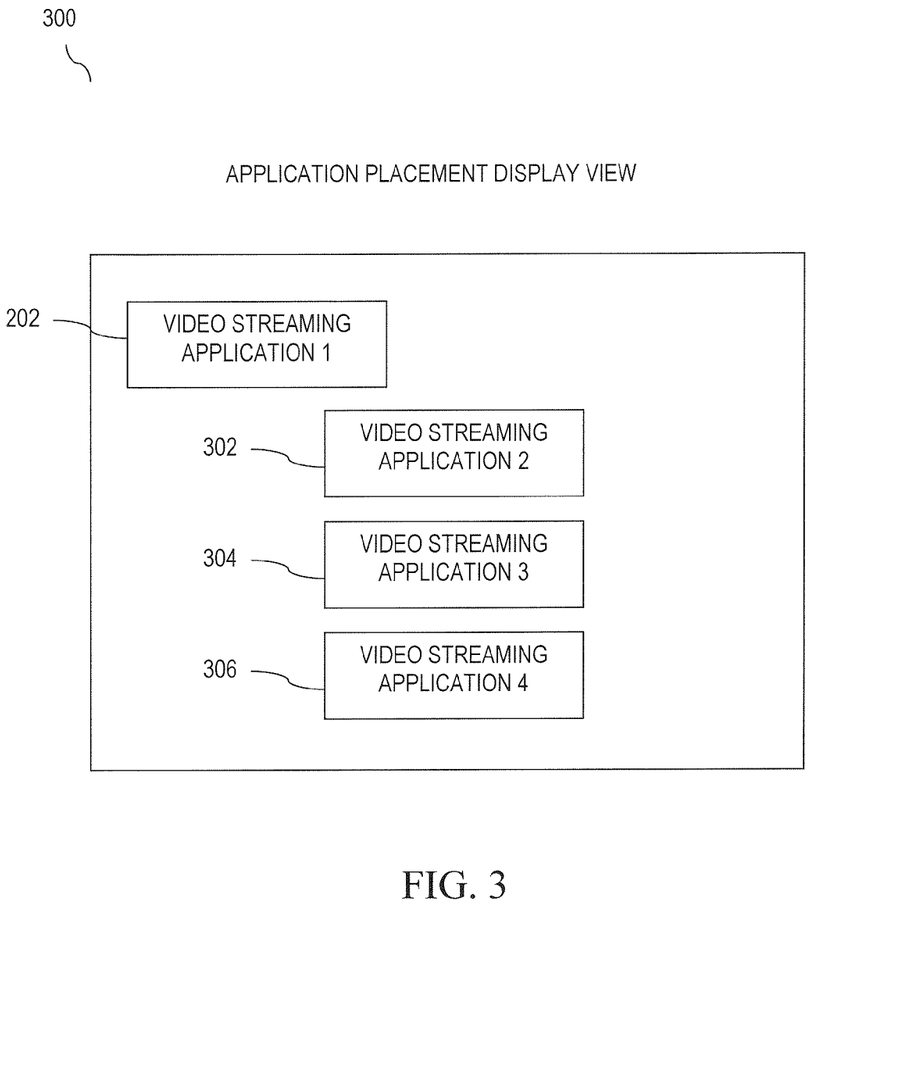
FIG. 3 illustrates another example display view of applications that may be selected according to an embodiment.

FIG. 3 represents an example display view 300 of a placement of ranked applications when icon 212 is selected in order to expand the alternatives to video streaming application 1 202. Video streaming applications 2, 3 and 4 are shown by blocks 302, 304 and 306, respectively. These video streaming applications are placed according to their ranking. In this case, they are listed from top to bottom in descending order, with the alternative applications indented. Many other placements can be determined based on the application rankings, including lists, circle arrangements, animations, etc.

A user may select an application and the application may be launched. According to an embodiment, application launcher 116 may be configured to launch a selected application of the ranked placement in response to a user selection. In some cases, an application may not have yet been purchased or loaded. Application installer 118 may initiate installation of the selected application prior to launching the selected application. Application installer 118 may also initiate purchase of the selected application prior to initiating installation. In some cases, an application may be provided on a device for free, but without a subscription. Purchase of the application may also include purchase of a subscription. In some cases, purchase of an application may not involve an amount charged but may be a trial period. In other cases, the application may be free. In such cases, providers may earn revenue and/or provide revenue to another party based on later revenue. According to some embodiments, this later revenue may include advertisements, other clickthrough opportunities or any other means of providing a benefit to the provider of the application. Sometimes, an application may be free in order to benefit from developing a customer base. Purchase of an application is meant to include any action related to selection of the application that takes place for a user to obtain the services or benefit of the application.

Applications may be presented to generate maximum revenue. Application placer 114 may be configured to determine how to place the applications in a manner designed to generate the most revenue, according to an embodiment. If an end user selected video streaming application 1, application launcher 116 or another component of launching system 110 may generate a billing value for the provider of video streaming application 1 for the clickthrough (i.e., "user acquisition"). Revenue may be generated based on actual user activity. Click behavior and advertisement behavior may also be used to consider billing values and default rankings. Different amounts may be billed based a combination of search results and user selection history.

Figure 4:
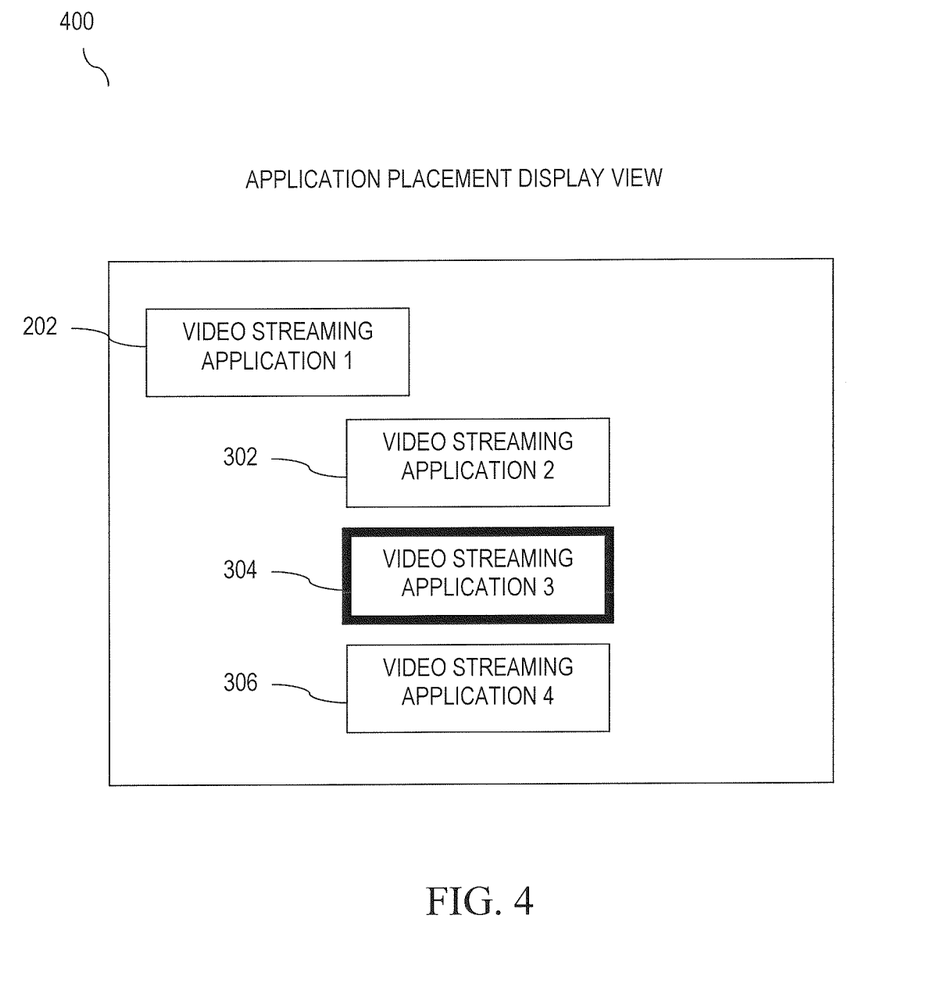
FIG. 4 illustrates an example display view of a user selection according to an embodiment.
Figure 5:
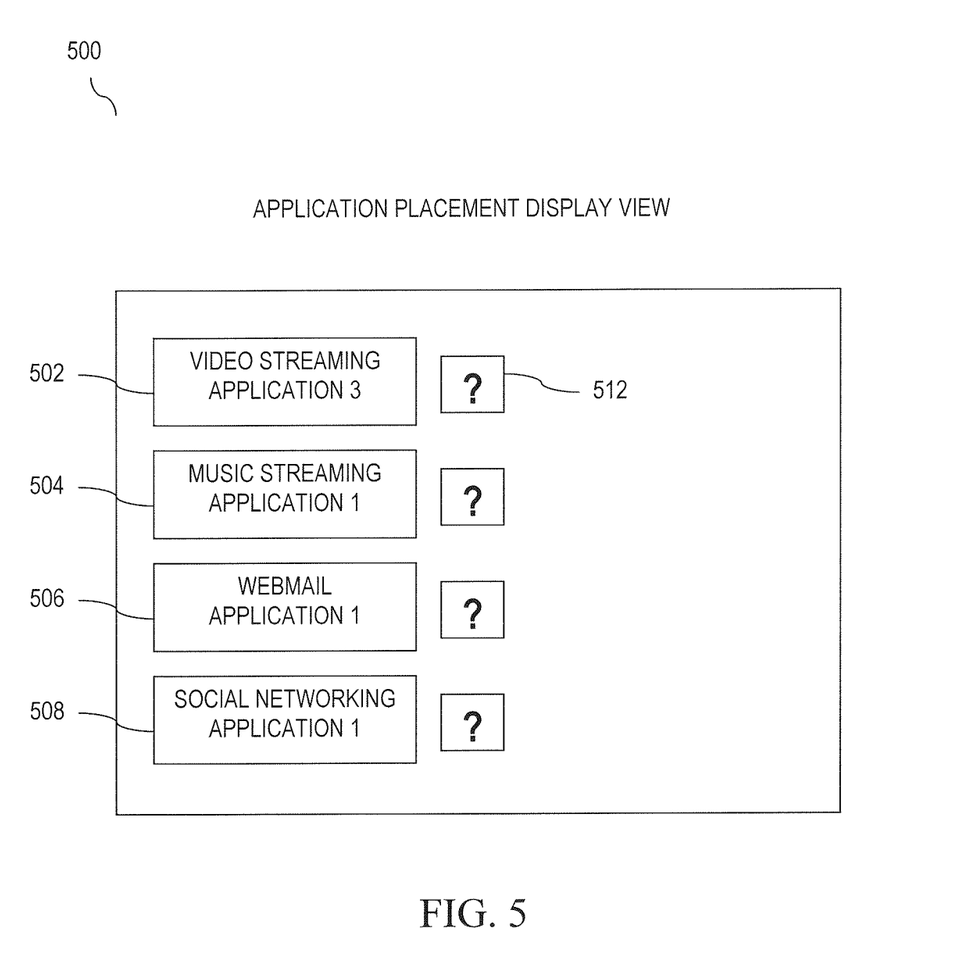
FIG. 5 illustrates an example display view of applications that may be selected according to an embodiment.

In another embodiment, if a user selects video streaming application 3 304, as shown in the example display view 400 of FIG. 4, video streaming application 3 304 may replace video streaming application 1 as the top choice. This new placement of video streaming application 3 502, with expansion icon 512, is shown in example display view 500. Applications 504-508 in this placement have retained the positions they held as applications 204-208 in the first placement. Launching system 110 may retain and/or forward data showing that an end user chose to replace video streaming application 1 when it was offered as a "recommended" option. A recommended option may be placed in a top spot or a preferred location. In some cases, how long an application is installed may also be considered.

Compared to the current alternative of vendors negotiating long-term bundling arrangements with application vendors, the auction-based approach has several advantages. For example, auction-based application launching is more efficient. Device manufacturers can rely on an automated system for determining placement and collecting revenue for user acquisition. Bids for customer acquisition can be revised at any time and new entrants can participate. Revenue may be maximized by dynamically placing the services that are likely to generate the most revenue in front of end users. Smaller vendors get paid as much for user acquisition as larger vendors. End user experience is improved by factoring in the rates of adoption and churn in determining optimal placement of service options.

Figure 6:
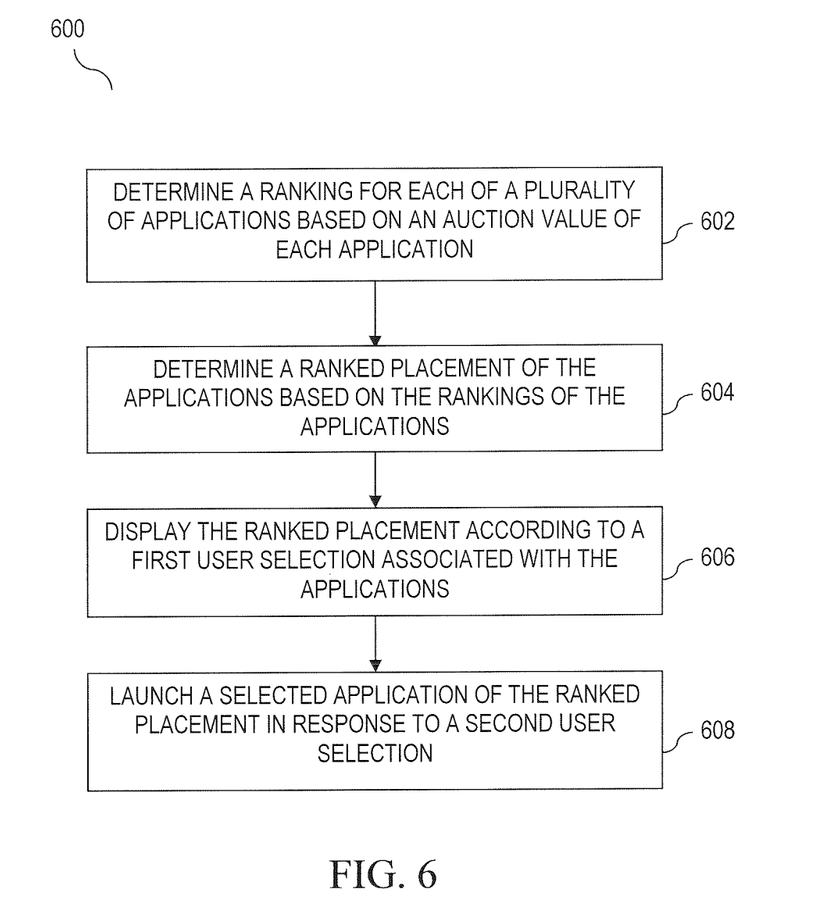
FIG. 6 is a flowchart illustrating a method for providing applications according to an embodiment.

FIG. 6 is a flowchart of exemplary method 600 for providing applications, according to an embodiment. While method 600 is described with respect to an embodiment of the present invention, method 600 is not meant to be limiting and may be used in other applications. In an example, method 600 may be used to provide applications using application launcher system 100 of FIG. 1. However, method 600 is not meant to be limited to application launcher system 100.

As shown in FIG. 6, exemplary method 600 begins at step 602 where a ranking is determined for each application based on an auction value. Various factors may be used to determine an auction value, such as a bid by an application provider. In some cases, lesser known applications may have an opportunity to become a preferred application based on a bid or user activity. According to a further embodiment, applications may be searched for on the device. Applications may also be searched for online or from one or more web application stores. Synchronized applications may also be involved.

In step 604, a placement of the applications is determined based on the rankings. A first placement may appear as a list of application categories, with a recommended or preferred application shown for each application category, as shown, for example, in display view 200 of FIG. 2. Each preferred or recommended application may present an opportunity to select alternative applications.

In step 606, a ranked placement may be displayed according to a user selection. For instance, an expansion of an application category may be requested. This user selection may involve clicking an icon next to a recommended application. The alternative applications may be displayed as ranked. For example, higher ranked applications may appear on top while lower ranked applications appear lower on the list. The placement determination of step 604 considers what can maximize revenue.

In step 608, an application selected from the ranked placement may be launched. In some cases, the application may need to be installed, purchased or subscribed to. Billing values may be generated in order to obtain revenue from the provider of the selected application. A new placement of the applications may be determined based on the user selection. Such a dynamic and automatic process increases flexibility and efficiency. Users have more freedom to choose applications that align with their individual wishes or requirements. Application and device providers are able to better maximize revenue.

Aspects of the embodiments for exemplary system 100 and/or method 600 or any part(s) or function(s) thereof may be implemented using hardware, software modules, firmware, tangible computer readable or computer usable storage media having instructions stored thereon, or a combination thereof and may be implemented in one or more computer systems or other processing systems.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for providing applications, comprising:
   determining a ranking for each of a plurality of applications based on an auction value of each corresponding application;
   determining a ranked placement of the plurality of applications based on the rankings of the plurality of applications;
   initially displaying a highest ranked application and an option configured to display the ranked placement as one or more alternatives when the option is selected;
   displaying the ranked placement in response to a first user selection of the option; and
   launching a selected application of the ranked placement in response to a second user selection, wherein each of the steps is implemented on a processing device.

2. The method of claim 1, further comprising initiating installation of the selected application prior to the launching.

3. The method of claim 2, further comprising initiating purchase of the selected application prior to initiating installation.

4. The method of claim 1, further comprising generating a billing value associated with the selected application.

5. The method of claim 1, further comprising determining the auction value based on one or more bids by one or providers of the plurality of applications.

6. The method of claim 1, wherein the determining a ranking includes determining each ranking based on one or more ranking factors.

7. The method of claim 6, wherein the determining a ranking includes determining a ranking based on a clickthrough rate of the corresponding application.

8. The method of claim 6, wherein the determining a ranking includes determining a ranking based on a churn rate of the corresponding application.

9. The method of claim 1, further comprising adjusting the ranked placement based on the second user selection.

10. The method of claim 1, further comprising determining the auction value based on a revenue projection.

11. A system for providing applications, comprising:
    an application ranker configured to determine a ranking for each of a plurality of applications based on an auction value of each corresponding application;
    an application placer, implemented with a computing device, configured to determine a ranked placement of the plurality of applications based on the rankings of the plurality of applications;
    a display viewer configured to initially display a highest ranked application and an option configured to display the ranked placement as one or more alternatives when the option is selected;
    an application launcher configured to display the ranked placement in response to a first user selection of the option; and
    launch a selected application of the ranked placement in response to a second user selection.

12. The system of claim 11, further comprising an application installer configured to initiate installation of the selected application prior to launching the selected application.

13. The system of claim 12, further comprising an application installer configured to initiate purchase of the selected application prior to initiating installation.

14. The system of claim 11, wherein the application launcher is further configured to generate a billing value associated with the selected application.

15. The system of claim 11, wherein the application ranker is further configured to determine the auction value based on one or more bids by one or providers of the plurality of applications.

16. The system of claim 11, wherein the application ranker is further configured to determine a ranking based on one or more ranking factors.

17. The system of claim 16, wherein the application ranker is further configured to determine a ranking based on a click-through rate of the corresponding application.

18. The system of claim 16, wherein the application ranker is further configured to determine a ranking based on a churn rate of the corresponding application.

19. The system of claim 11, wherein the application placer is further configured to adjust the ranked placement based on the second user selection.

20. The system of claim 11, wherein the application ranker is further configured to determine the auction value based on a revenue projection.

* * * * *